(12) United States Patent
Zhang et al.

(10) Patent No.: US 12,233,844 B2
(45) Date of Patent: Feb. 25, 2025

(54) METHOD FOR CONTROLLING INTERFERENCE TORQUE, CONTROLLER, EQUIPMENT AND MEDIUM

(71) Applicant: GREAT WALL MOTOR COMPANY LIMITED, Hebei (CN)

(72) Inventors: Jie Zhang, Hebei (CN); Xiao Wang, Hebei (CN); Hailan Wang, Hebei (CN); Lei Zhang, Hebei (CN); Haijun Song, Hebei (CN); Nan Zhang, Hebei (CN); Yan Sun, Hebei (CN); Yazhou Shen, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 310 days.

(21) Appl. No.: 18/009,380

(22) PCT Filed: Jun. 11, 2021

(86) PCT No.: PCT/CN2021/099848
§ 371 (c)(1),
(2) Date: Dec. 9, 2022

(87) PCT Pub. No.: WO2021/249556
PCT Pub. Date: Dec. 16, 2021

(65) Prior Publication Data
US 2023/0219552 A1   Jul. 13, 2023

(30) Foreign Application Priority Data
Jun. 12, 2020   (CN) .......................... 202010536563.8

(51) Int. Cl.
*B60W 20/10*   (2016.01)
*B60W 10/06*   (2006.01)
(Continued)

(52) U.S. Cl.
CPC ............ *B60W 20/10* (2013.01); *B60W 10/06* (2013.01); *B60W 10/08* (2013.01); *B60W 30/02* (2013.01);
(Continued)

(58) Field of Classification Search
CPC ...... B60W 20/10; B60W 10/08; B60W 30/02; B60W 30/1882; B60W 10/06;
(Continued)

(56) References Cited

U.S. PATENT DOCUMENTS 10,000,196 B2 *   6/2018   Du .................. B60W 30/18172
10,875,521 B2 *   12/2020   Pettersson .............. B60K 6/547
(Continued)

FOREIGN PATENT DOCUMENTS

CN   101602362 A   12/2009
CN   102275580 A   12/2011
(Continued)

OTHER PUBLICATIONS

English translation of CN103847729A; http://translationportl.epo.org; Dec. 2, 2024 (Year: 2024).*
(Continued)

*Primary Examiner* — Roger L Pang
(74) *Attorney, Agent, or Firm* — Schmeiser, Olsen & Watts LLP

(57) ABSTRACT

A method for controlling an interference torque for a vehicle is provided. The method is applied to a new energy vehicle including an electric motor and an engine, and includes steps of: arbitrating between a pedal torque of a driver and an interference torque required by ESP; performing an initial allocation on the electric motor and/or the engine in response to the pedal torque when the vehicle is in a hybrid drive mode, to meet an engine torque request while ensuring that the engine is operated at an optimal operation point; and
(Continued)

determining, based on the initial allocation, whether the motor is capable of fully responding to the arbitrated torque, if so, controlling the motor to respond to the arbitrated torque in priority, otherwise controlling the engine and the motor to cooperatively respond to the arbitrated torque.

17 Claims, 2 Drawing Sheets

(51) Int. Cl.
  *B60W 10/08* (2006.01)
  *B60W 30/02* (2012.01)
(52) U.S. Cl.
  CPC ... *B60W 2510/083* (2013.01); *B60W 2540/10* (2013.01); *B60W 2710/0666* (2013.01); *B60W 2710/083* (2013.01); *B60W 2720/40* (2013.01)
(58) Field of Classification Search
  CPC ......... B60W 2720/40; B60W 2540/10; B60W 2710/0666; B60W 1710/083; B60W 2710/06; B60W 2510/083; B60W 20/40
  USPC .......................................... 477/3; 701/82, 84
  See application file for complete search history.

(56) References Cited

U.S. PATENT DOCUMENTS

| | | | | |
|---|---|---|---|---|
| 2013/0297107 A1* | 11/2013 | Dai | ....................... | B60W 10/08 180/65.265 |
| 2015/0329100 A1* | 11/2015 | Kim | ................ | B60W 30/18172 180/65.265 |
| 2018/0050683 A1* | 2/2018 | Cho | .................... | B60W 10/184 |

FOREIGN PATENT DOCUMENTS

| | | |
|---|---|---|
| CN | 103847729 A | 6/2014 |
| CN | 104828068 A | 8/2015 |
| CN | 106274883 A | 1/2017 |
| CN | 106347352 A | 1/2017 |
| CN | 108263246 A | 7/2018 |
| CN | 109291916 A | 2/2019 |
| CN | 112758080 A | 5/2021 |
| JP | 2013063722 A | 4/2013 |

OTHER PUBLICATIONS

International Search Report for PCT /CN2021/099848 issued Sep. 10, 2021.

* cited by examiner

METHOD FOR CONTROLLING INTERFERENCE TORQUE, CONTROLLER, EQUIPMENT AND MEDIUM

CROSS-REFERENCE TO RELATED APPLICATIONS

This application claims priority to PCT/CN2021/099848, having a filing date of Jun. 11, 2021, which is based on Chinese Patent Application No. 202010536563.8, having a filing date of Jun. 12, 2020, the entire contents both of which are hereby incorporated by reference.

FIELD OF TECHNOLOGY

The following relates to the field of vehicle control technology, and in particular, to a method and a device for controlling an interference torque, a controller, an equipment, a program and a medium.

BACKGROUND

The electronic stability program (ESP) is an important component of current vehicles, which improves handling performance while preventing the vehicle from reaching its dynamic limits. For example, an interference torque is sent by the ESP through a sub-function of the ESP, such as a traction control system (TCS), to assist the vehicle in moving from an unstable to a stable state.

However, most vehicles currently rely solely on an engine to respond to the interference torque from the ESP, and the engine, due to its inherent structure, suffers from inaccurate response torque accuracy and slow response time, which affects the function of the TCS and other functions, so that the stability of the vehicle cannot be better guaranteed.

SUMMARY

An aspect relates to a method for controlling an interference torque of a vehicle, to solve the problem that the stability of the vehicle cannot be guaranteed by relying solely on the engine to respond to the interference torque from the ESP.

To achieve the above aspect, solutions of the present disclosure may be implemented as follows:

A method for controlling an interference torque of a vehicle is provided, which is applied to a new energy vehicle including an electric motor and an engine. The method for controlling an interference torque of the vehicle includes steps of: arbitrating between a pedal torque of a driver and an interference torque required by an ESP and outputting an arbitrated torque: performing an initial allocation on the motor and/or the engine in response to the pedal torque when the vehicle is in a hybrid drive mode, to meet a torque request of the engine while ensuring that the engine is operated at an optimum operation point; and determining, based on the initial allocation, whether the motor is capable of fully responding to the arbitrated torque, controlling the motor to respond to the arbitrated torque in priority when it is determined that the motor is capable of fully responding to the arbitrated torque, and controlling the engine and the motor to cooperatively respond to the arbitrated torque when it is determined that the motor is incapable of fully responding to the arbitrated torque.

In an embodiment, the step of arbitrating between a pedal torque of a driver and an interference torque required by an ESP includes steps of: determining, as for the interference torque when the ESP requires the torque to increase, that a greater one of the interference torque and the pedal torque is the arbitrated torque: or determining, as for the interference torque when the ESP requires the torque to decrease, that a smaller one of the interference torque and the pedal torque is the arbitrated torque.

In an embodiment, before the initial allocation is performed, the method for controlling an interference torque of a vehicle also includes a step of determining a drive mode of the vehicle based on an actual state of the engine, where the drive mode includes the hybrid drive mode and a pure electric mode.

In an embodiment, the method for controlling an interference torque of a vehicle also includes a step of controlling the motor to respond to the arbitrated torque when the vehicle is in the pure electric mode.

In an embodiment, the step of determining whether the motor is capable of fully responding to the arbitrated torque comprises: calculating a motor torque Fem2 after the motor is expected to respond to the arbitrated torque using the following formula: $Fem2=Fem1+F2-F1$, wherein Fem1 represents the motor torque before the motor is controlled to respond to the arbitrated torque, F2 represents the arbitrated torque and F1 represents the pedal torque. In this step, a torque Fem3 to which the motor is capable of responding is determined using the following formula: $Fem3=Max[Min(Fem2, F_{UL}), F_{LL}]$, where $F_{UL}$ is the maximum limit torque of the motor, $F_{LL}$ is the minimum limit torque of the motor, Max indicates a greater one of the two, and Min indicates a smaller one of the two. Then, if Fem3 is equal to Fem2, it is determined that the motor is capable of fully responding to the arbitrated torque, otherwise, it is determined that the motor is incapable of fully responding to the arbitrated torque.

In an embodiment, the step of controlling the engine and the motor to cooperatively respond to the arbitrated torque includes steps of: determining the torque Feng2 to which the engine needs to respond according to the following equation: $Feng2=F2-Fem3$; and controlling the engine to release an ignition angle in rapid response to the determined torque Feng2.

In an embodiment, the torque request of the engine includes a fire path request and an air path request, and the method for controlling an interference torque of a vehicle also includes a step of adjusting the fire path request and the air path request of the engine to keep torques in the fire path request and the air path request to be in consistent when it is determined that the engine and the motor are controlled to respond to the arbitrated torque, cooperatively.

In an embodiment, the interference torque required by the ESP is a torque required in case of activation of a function of a traction control system (TCS) of the vehicle.

Compared to the existing technologies, the method for controlling an interference torque of a vehicle described in the present disclosure has the following advantages.

(1) the method for controlling an interference torque of a vehicle described in the present disclosure enables the motor to respond to ESP interference in priority, while a torque response of the motor is faster, more stable and more accurate than that of the engine, thereby enabling the vehicle to respond rapidly to the interference torque from the ESP, allowing the vehicle to be fast and stable, and greatly improving the safety of the vehicle.

(2) the method for controlling an interference torque of a vehicle described in the present disclosure makes it possible for the engine to operate at the optimal operation point if the engine co-response is not required, and the engine torque does not vary due to the interference, thus will not cause torque fluctuations.

Another aspect of the present disclosure is to provide a device for controlling an interference torque of a vehicle, to solve the problem that the stability of the vehicle cannot be guaranteed by relying solely on the engine to respond to the interference torque from the ESP.

To achieve this aspect, solutions of the present disclosure may be implemented as follows:

A device for controlling an interference torque of a vehicle is provided, which is applied to a new energy vehicle including an electric motor and an engine. The device for controlling an interference torque of a vehicle includes: a torque arbitration module, a first torque allocation module, and a second torque allocation module. The torque arbitration module is configured to arbitrate a pedal torque of a driver and an interference torque required by an electronic stability program (ESP), and to output an arbitrated torque. The first torque allocation module is configured to perform an initial allocation on the motor and/or the engine in response to the pedal torque when the vehicle is in a hybrid drive mode, to meet the torque request of the engine while ensuring that the engine is operated at an optimum operation point. The second torque allocation module is configured to determine, based on the initial allocation, whether the motor is capable of fully responding to the arbitrated torque, and is configured to control the motor to respond to the arbitrated torque in priority when it is determined that the motor is capable of fully responding to the arbitrated torque, and to control the engine and the motor to cooperatively respond to the arbitrated torque when it is determined that the motor is incapable of fully responding to the arbitrated torque.

The device for controlling an interference torque of the vehicle has the same advantages as that of the method for controlling an interference torque of the vehicle with respect to the existing technologies, which will not be repeated herein.

Another aspect of the present disclosure is to provide a vehicle controller, to solve the problem that the stability of the vehicle cannot be guaranteed by relying solely on the engine to respond to the interference torque from the ESP.

To achieve this aspect, solutions of the present disclosure may be implemented as follows:

A vehicle controller is provided, which is configured to run a program. The program is run for performing the method for controlling an interference torque according to any of the foregoing.

The vehicle controller has the same advantages as that of the method for controlling an interference torque of the vehicle with respect to the existing technologies, which will not be repeated herein.

Another aspect of the present disclosure is to provide a machine-readable storage medium, to solve the problem that the stability of the vehicle cannot be guaranteed by relying solely on the engine to respond to the interference torque from the ESP.

To achieve this aspect, solutions of the present disclosure may be implemented as follows:

A machine-readable storage medium is provided, on which instructions are stored, the instructions cause the machine to perform the method for controlling an interference torque as described in any of the foregoing.

The machine-readable storage medium has the same advantages as that of the method for controlling an interference torque of the vehicle with respect to the existing technologies, which will not be repeated herein.

The present disclosure also provides a computing processing equipment, which includes: a memory in which a computer readable code is stored; and one or more processors. The computer readable code, when being executed by the one or more processors, causes the computing processing equipment to perform the above method for controlling an interference torque of the vehicle provided in the present disclosure.

The present disclosure also provides a computer program, which includes a computer readable code, that, when being run on a computing processing device, causes the computing processing equipment to perform the above method for controlling an interference torque of a vehicle as provided in the present disclosure.

The present disclosure also provides a computer readable storage medium in which the computer program provided by the present disclosure is stored.

Other features and benefits of the present disclosure will be further described in the detailed description of the embodiments.

BRIEF DESCRIPTION

Some of the embodiments will be described in detail, with references to the following Figures, wherein like designations denote like members, wherein.

Reference symbols are mainly listed as follows:

210—torque arbitration module; 220—first torque allocation module; and 230—second torque allocation module.

DETAILED DESCRIPTION

The present disclosure will be described in detail below with reference to the drawings and in conjunction with the embodiments.

Figure 1:
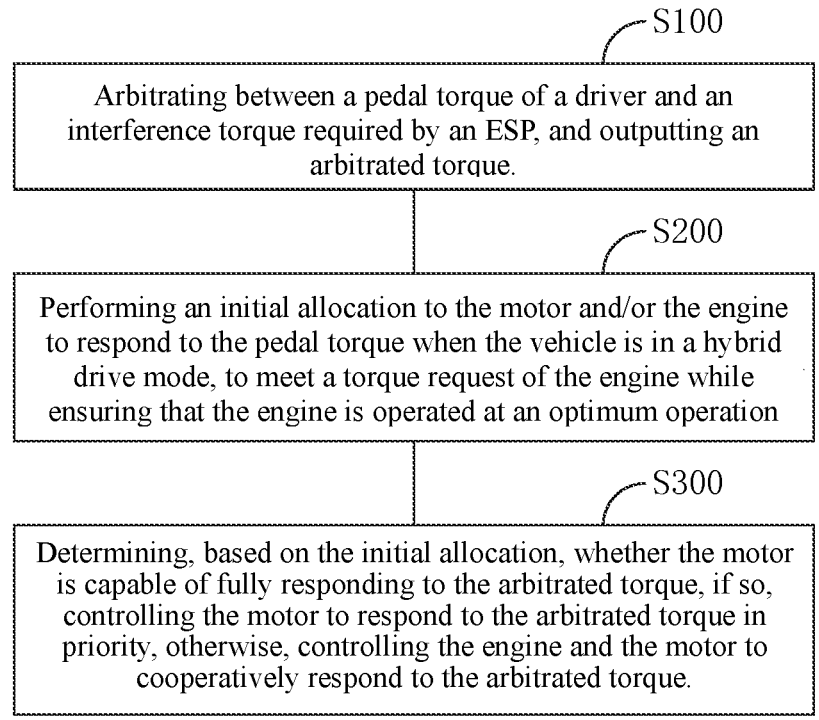
FIG. 1 is a schematic flow diagram of a method for controlling an interference torque of a vehicle in accordance with an embodiment of the present disclosure.

FIG. 1 is a flow diagram of a method for controlling an interference torque of a vehicle in accordance with an embodiment of the present disclosure. The method is applicable to a new energy vehicle that includes a motor and an engine, such as a P2 model having a P2 motor.

As shown in FIG. 1, the method for controlling an interference torque according to an embodiment of the present disclosure may include steps S100 to S300.

In step S100, an arbitration is performed on a pedal torque of a driver and an interference torque required by an ESP, and an arbitrated torque is output.

In this step, the interference torque required by the ESP is, for example, a torque required for activation of a TCS function of the vehicle.

In an embodiment, the step S100 may include that, a greater one of the interference torque and the pedal torque is determined to be the arbitrated torque as for the interference torque when the ESP requires the torque to increase, or a smaller one of the interference torque and the pedal torque is determined to be the arbitrated torque as for the interference torque when the ESP requires the torque to decrease.

For ease of understanding, the interference torque when the ESP requires the torque to increase is denoted as an increasing torque Fesp1 and the interference torque when the ESP requires the torque to decrease is denoted as a decreasing torque Fesp2, while the pedal torque of the driver is denoted as F1 and the output arbitrated torque is denoted as F2. Accordingly, the core idea for performing an arbitration on torque in the above embodiment is that the pedal torque F1, when being arbitrated with Fesp1, a greater one is taken, and when being arbitrated with Fesp2, a smaller one is taken, which can be expressed as the following equation.

$$F2 = Max[Min(F1, Fesp2), Fesp1] \quad (1)$$

In this equation, Min indicates a smaller value of the two and Max indicates a greater value of the two.

Understandably, this equation (1) may also be expressed as F2=Min [Max (F1, Fesp1), Fesp2].

In addition, with respect to equation (1), it can be understood that this equation also illustrates a determination of whether F1 is equal to F2. When the two are equal, it is indicated that no ESP interference is occurred, and when the two are not equal, it is indicated that an ESP interference is occurred, i.e., an interference torque is presented. Understandably, subsequent steps in the embodiment of the present disclosure are performed in the event that the ESP interference is occurred In step S200, when the vehicle is in a hybrid drive mode, an initial allocation is performed to the motor and/or the engine in response to the pedal torque to meet a torque request of the engine while ensuring that the engine is operated at an optimum operation point.

Here, a drive mode of the vehicle is first determined. In the case of the P2 model, for example, in a normal drive state of the P2 model, three possible drive modes may be included. That is, A, engine drive with motor generation; B, engine and motor drive together; and C, motor drive alone. The A and B drive modes are collectively referred to as the hybrid drive mode and the C drive mode is referred to as the pure electric mode. For the P2 model, normally a front-axle-torque allocation requires a determination of whether the current drive mode is hybrid or pure electric. For the hybrid drive mode, the front axle torque is required to be distributed to both the engine and motor, while for the pure electric mode, the front axle torque can be distributed directly to the motor.

Accordingly, in step S200, before the initial allocation is performed, the method for controlling an interference torque in an embodiment of the present disclosure may also include a step of determining a drive mode of the vehicle based on an actual state of the engine. In an embodiment, the motor is controlled to respond to the arbitrated torque when the vehicle is in the pure electric mode.

For example, when the engine is in a running state, the current drive mode is the hybrid drive mode and step S200 is performed. When the engine is in an off state, the current drive mode is the pure electric mode (EV) and the motor responds directly to the arbitrated torque F2 as described above.

Thus, when the drive mode is the hybrid drive mode, the engine and the motor both respond to the interference torque. Generally, the torque allocation between the engine and the motor is influenced by a torque demand of the driver, a torque limit of the engine torque, an actual torque of the engine, a speed of the engine and other factors. The basic principle is that when the engine has the ability to take on the full torque demand of the driver, then the drive mode is engine driven with motor generation, and when the engine cannot take on the full torque demand of the driver, then the engine and motor need to drive together. In an embodiment of this disclosure, with reference to the step S200, the torque allocation between the engine and the motor is required to be able to meet the torque request of the engine to ensure that the engine is always operated at the optimum operation point. In this regard, to ensure that the engine is always operated at the optimum operation point, it is considered to introduce an engine load-point-shift strategy for the torque allocation between the engine and the motor. The engine load-point-shift strategy may be expressed as that a torque allocation to the motor and the engine is performed based on the universal characteristics of the engine, to ensure that the engine is operated at the optimum operation point and to save fuel consumption.

For example, when the drive mode is the hybrid drive mode and the torque request of the engine is denoted as Feng1, the initial allocation of torque between the engine and the motor are represented by the following equation (2), based on equation (1).

$$F1 = Feng1 + Fem1 \quad (2)$$

In this equation, Fem1 represents the torque contributed by the motor in meeting torque request of the engine and F1 represents the pedal torque of the driver. As opposed to a scenario where a torque response of the motor and/or engine is made directly in response to the arbitrated torque after the torque arbitration, this equation (2) shows that the embodiment of this disclosure also involves an "initial allocation" to ensure that the "engine is operated at the optimum operation point" before the response of the motor and/or engine, here, a load-point-shift strategy is used for the engine that allows the engine to be always operated at the optimum operation point regardless of the response to the interference torque, thus ensuring the efficiency of the engine and contributing to saving fuel consumption.

In addition, it should be understood that the torque request of the engine includes a fire path request and an air path request. The fire path request is a request for torque to adjust an ignition angle of the engine, and the air path request is a request for torque to adjust a throttle of the engine. The fire path request and the air path request are simultaneously sent to the engine and the engine will respond to the smaller one of the two if the engine is able to respond. The effect of the fire path request and the air path request on the ability of the engine to respond to torque will be further described below with reference to specific embodiments, and will not be discussed here.

In step S300, it is determined, based on the initial allocation, whether the motor is capable of fully responding to the arbitrated torque, if the motor is capable of fully responding to the arbitrated torque, then the motor is controlled to respond to the arbitrated torque in priority; and if the motor is incapable of fully responding to the arbitrated torque, then the engine and the motor are controlled to respond to the arbitrated torque, cooperatively.

In this embodiment, the step S300 is provided with respect to a scenario where the vehicle is in the hybrid drive mode. For a scenario where the vehicle is in pure electric mode, the torque allocation may be expressed by the following equation (3), i.e., $$F2 = Fem \quad (3)$$

In this equation, Fem represents the torque contributed by the motor in pure electric mode, i.e., this equation (3) shows that the interference torque in pure electric mode is fully responded to by the motor. In an embodiment, the motor should respond rapidly enough at this point to ensure that no torque filtering is occurred, for example, a filter module will be triggered by an ESP interference activation condition to not perform a filtering.

The step S300 is directed to the scenario where the vehicle is in the hybrid drive mode, under a condition that the engine is guaranteed to be operated at the optimum operation point, the following step may be further included to determine whether the motor is capable of fully responding to the arbitrated torque.

1) The following equation (4) is used to calculate a motor torque Fem2 after the motor is expected to respond to the arbitrated torque:

$$Fem2 = Fem1 + F2 - F1 \qquad (4)$$

In this equation, Fem1 represents a motor torque before the motor responds to the arbitrated torque, with reference to equation (2), Fem1 represents a motor torque determined by the initial allocation when the torque request of the engine is met; as described above, F2 represents the arbitrated torque and F1 represents the pedal torque.

(2) The following equation (5) is further used to determine a torque Fem3 to which the motor is capable of responding.

$$Fem3 = \text{Max}[\text{Min}(Fem2, F_{UL}), F_{LL}] \qquad (5)$$

In this equation, $F_{UL}$ is the maximum limit torque of the motor and $F_{LL}$ is the minimum limit torque of the motor.

That is, this equation (5) indicates that: the motor torque Fem2 after ESP interference is judged relative to the torque limit value, and if Fem2 is within the limit value formed by the maximum limit torque $F_{UL}$ of the motor and the minimum limit torque $F_{LL}$ of the motor, then the response to the interference torque can be fully contributed by the motor.

(3) For equation (5), when Fem2 is within the limit value formed by the maximum limit torque $F_{UL}$ of the motor and the minimum limit torque $F_{LL}$ of the motor, Fem3=Fem2, then it is determined that the motor can fully respond to the arbitrated torque, otherwise it is determined that the motor cannot fully respond to the arbitrated torque.

In the case that the motor is capable of fully responding to the arbitrated torque (i.e., the interference), the torque in the torque request of the engine is a value initially allocated in the above step S200. At this time, the torque request of the engine is processed by the point-of-load transfer strategy, the engine is operated at the optimum operation point, the torque in the fire path request and the torque in the air path request are enabled to be equal and sent to the engine together.

4) A collaborative engine response is required when Fem3 is not equal to Fem2, as it is indicated that the motor is incapable of fully responding to the interference torque from the ESP. In an embodiment, the torque Feng2 to which the engine needs to respond may be determined by the following equation (6).

$$Feng2 = F2 - Fem3 \qquad (6)$$

Further, to enable a rapid response of the engine, the engine is controlled to release the ignition angle in rapid response to the determined torque Feng2. For example, in equation (5), a flag bit of the ignition angle is activated to control the ignition angle to be released based on the determination that Fem3 is not equal to Fem2. At this time, the engine is responded rapidly and no torque filtering is occurred.

Furthermore, when it is determined that the engine and the motor are controlled to respond to the arbitrated torque, cooperatively. The release of the ignition angle causes the torque in the fire path request to be no longer equal to the torque in the air path request, thus, for the purpose of meeting the torque request of the engine, the fire path request and the air path request of the engine should be adjusted to match the torques in the two requests while calculating the torque that the engine needs to respond in the cooperated response. For example, when the engine is controlled to respond to the interference torque from the ESP, if only the fire path is adjusted without adjusting the air path, the ignition angle will be pushed while the air path of the engine remains unchanged, thus the reduction in torque of the engine is limited, which is not fast enough to reduce to the torque request of the engine required by Feng1, therefore, the fire path request and the air path request need to be adjusted simultaneously. If the ignition angle is not released, then the torque in the fire path request of the engine is equal to the calculated torque of the last air path request, and if the ignition angle is released, the torque in the air path request of the engine is equal to the calculated torque of the last fire path request. It should be understood that there are currently schemes to assign urgency levels to ESP interference to determine the adjustment to the fire path or air path of the engine based on the urgency level. However, in practice, any interference from the ESP should be rapidly responded to, and adjusting only the fire path without adjusting the air path will result in an inadequate response by the engine because of the limited range of ignition angle adjustment. Therefore, the embodiment of the present disclosure does not require an urgency level treatment for ESP interference, when the engine is cooperated with the motor to make a response, the engine is guaranteed to respond as rapidly as possible (ignition angle guarantee) by requesting a release of the ignition angle and requesting an equal torque for the fire and air paths through simultaneous adjustment of the fire path request and the air path request, moreover, and when the ignition angle cannot meet the fire path request, the requested torque is achieved through the throttle, thus enabling an accurate response (where fire and air path torque are in consistent).

In summary, the method provided by an embodiment of the present disclosure enables the motor to respond to ESP interference in priority, and the torque response of the motor is faster, more stable and more accurate than that of the engine, thus the vehicle is enabled to respond rapidly to the interference torque from the ESP, allowing the vehicle to be fast and stable, and greatly improving the safety of the vehicle. Meanwhile, the method embodiment of this disclosure also makes it possible that during a rapid stabilization process of the vehicle, if the engine co-response is not required, the torque of the engine, due to the point-of-load transfer strategy, is capable of guaranteeing that the engine is always operated at the optimal operation point. The torque of the engine will not be changed due to the interference, thus no torque fluctuation will be caused, while when the engine co-response is required, priority will be given to ensuring that through the simultaneous regulation of the fire and air paths, the response time and response accuracy of the interference. In addition, when the motor is prioritized to respond to the decreasing torque, a negative torque of the motor response can be recharged by the battery pack.

In the case of the vehicle having a P2 motor, the method in the embodiment of this disclosure is applied such that the P2 motor responds preferentially in the vast majority of cases where interference occurs, and that P2 motor is able to fully respond to the interference torque generated by the TCS, etc., on its own capability, and the response time and torque accuracy of the motor are more outstanding compared to the engine. In a small number of cases, for example, a capacity of the motor is limited due to the characteristics of the motor in low temperature, high SOC, etc., the application of the method in an embodiment of the present disclosure allows the motor and engine to be controlled to respond to the interference in cooperation while ensuring that the interference torque generated by the TCS, etc., is met.

Figure 2:
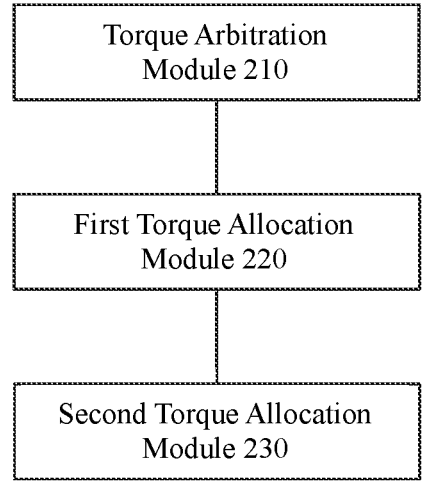
FIG. 2 is a schematic structural diagram of a device for controlling an interference torque of a vehicle in accordance with another embodiment of the present disclosure.

FIG. 2 is a schematic structural diagram of a device for controlling an interference torque of a vehicle according to another embodiment of the present disclosure, which is based on the same inventive concept as the method for controlling an interference torque in the above embodiments. As shown in FIG. 2, the device for controlling an interference torque of a vehicle may include: a torque arbitration module 210, a first torque allocation module 220 and a second torque allocation module 230. The torque arbitration module 210 is configured to arbitrate a pedal torque of a driver and an interference torque required by an ESP, and to output an arbitrated torque. The first torque allocation module 220 is configured to perform an initial allocation on the motor and/or the engine in response to the pedal torque when the vehicle is in a hybrid drive mode, to meet the torque request of the engine and to ensure that the engine is operated at an optimal operation point. The second torque allocation module 230 is configured to determine, based on the initial allocation, whether the motor is capable of fully responding to the arbitrated torque, and is configured to control the motor in priority to respond to the arbitrated torque when it is determined that the motor is capable of fully responding to the arbitrated torque, and to control the engine and the motor to cooperatively respond to the arbitrated torque when it is determined that the motor is incapable of fully responding to the arbitrated torque.

The device for controlling an interference torque has the same or similar implementation details and effects as that of the method for controlling an interference torque in the above embodiment, which will not be repeated herein.

In accordance with a further embodiment of the present disclosure, a vehicle controller is provided, which is configured to run a program. The program, when being run on the vehicle controller, causes the method for controlling an interference torque of a vehicle described in the above embodiment to be implemented.

In this embodiment, the vehicle controller may be a separately configured controller or may be an electronic control unit (ECU) etc. that the vehicle itself has, the embodiments of the present disclosure are not limited in this respect.

In addition, the vehicle controller has the same or similar implementation details and effects as that of the method for controlling an interference torque in the above embodiment, which will not be repeated herein.

To implement the above embodiments, the present disclosure also provides a computing processing equipment, which includes: a memory in which a computer readable code is stored; and one or more processors. The computer readable code, when being executed by the one or more processors, causes the computing processing equipment to perform the method for controlling an interference torque of a vehicle as above-described.

The computing processing equipment may be implemented as a vehicle controller.

To achieve the foregoing embodiments, the present disclosure also provides a computer program, which includes a computer readable code that, when being run on the computing processing equipment, causes the computing processing equipment to perform the method for controlling an interference torque of a vehicle as above-described.

To achieve the foregoing embodiments, the present disclosure also provides a computer readable storage medium, in which the aforementioned computer program is stored.

Figure 3:
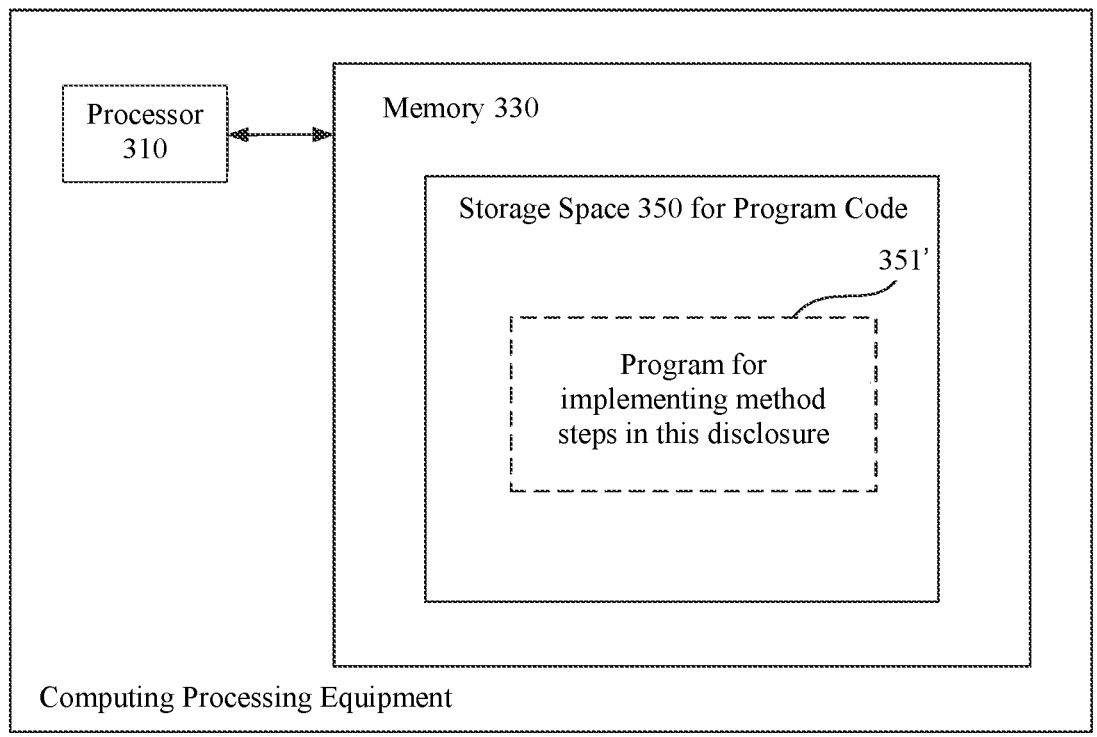
FIG. 3 is a schematic structural diagram of a computing processing equipment in accordance with an embodiment of the present disclosure.
Figure 4:
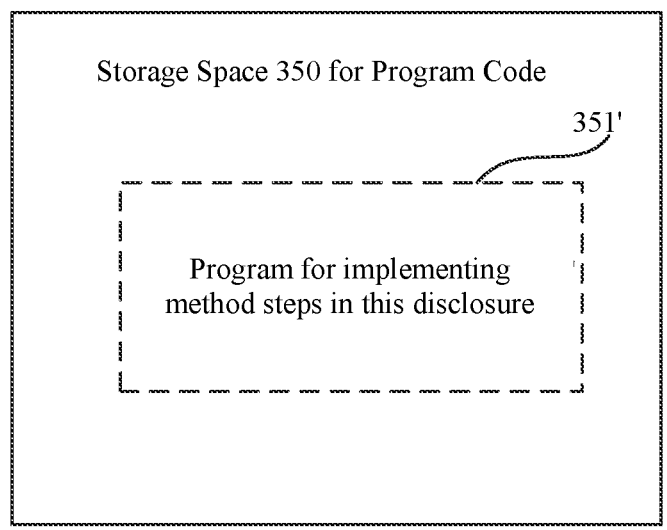
FIG. 4 is a schematic diagram of a storage unit for portable or fixed implementation of a program code for a method according to the present disclosure, in accordance with an embodiment of the present disclosure.

FIG. 3 provides a schematic structural diagram of the computing processing equipment according to an embodiment of the present disclosure. The computing processing equipment typically includes a processor 310 and a computer program product (non-transitory computer readable storage medium having instructions, which when executed by a processor, perform actions) or computer-readable medium in the form of a memory 330. Memory 330 may be an electronic memory such as a flash memory, an electrically erasable programmable read-only memory (EEPROM), an EPROM, a hard disk, or a ROM. Memory 330 has a storage space 350 for program code 351, the program code is used for implementing any of the steps in the method as described above. For example, the storage space 350 for program code may include individual program codes 351 for implementing various steps in the above-described method. These program codes may be read from or written to one or more computer program products. These computer program products include program code carriers such as hard disks, compact disks (CDs), memory cards or floppy disks. Such a computer program product is typically a portable or fixed storage unit as shown in FIG. 4. The storage unit may have storage segments, storage space etc. similarly arranged to the memory 330 in the server of FIG. 3. The program code may, for example, be compressed in an appropriate form. Typically, the storage unit includes computer readable code 351', i.e., code which can be read by, for example, a processor such as 310 which, when run by a server, causes that server to perform the various steps in the method as described above.

It would be appreciated by those skilled in the art that embodiments of the present application may be provided as methods, systems, or computer program products. Accordingly, the present application may be presented in the form of an entirely hardware embodiment, an entirely software embodiment, or an embodiment combining software and hardware aspects. Further, the present application may be presented in the form of a computer program product implemented on one or more computer-readable storage media (including, but not limited to, disk memory. CD-ROM, optical memory, etc.) containing computer-readable program code therein.

The present application is described with reference to flow charts and/or block diagrams of methods, equipment (systems), and computer program products according to embodiments of the present application. It should be understood that each of the processes and/or blocks in the flowchart and/or block diagram, and a combination of the processes and/or blocks in the flowchart and/or block diagram, may be implemented by computer program instructions. These computer program instructions may be provided to a processor of a general-purpose computer, a dedicated computer, an embedded processor or other programmable data processing equipment to produce a machine such that the instructions executed by the processor of the computer or other programmable data processing equipment generate a device for implementing the functions specified in one or more processes of the flowchart and/or one or more blocks of the block diagram.

These computer program instructions may also be stored in a computer readable storage capable of directing the computer or other programmable data processing equipment to operate in a particular manner such that the instructions stored in the computer readable storage generate an article of manufacture including an instruction device that implements the function specified in one or more processes of the flowchart and/or one or more blocks of the block diagram.

These computer program instructions may also be loaded onto a computer or other programmable data processing equipment such that a series of operational steps are performed on the computer or other programmable equipment to produce computer-implemented processing such that the instructions executable on the computer or other programmable equipment provide steps for implementing the functions specified in one process or a plurality of processes in the flowchart and/or one block or a plurality of blocks in the block diagram.

In an exemplary configuration, the computing equipment includes one or more processors (CPUs), input/output interfaces, network interfaces, and memory.

Memory may include non-permanent memory, random access memory (RAM) and/or non-volatile memory in computer readable media, such as read-only memory (ROM) or flash memory (flash RAM). Memory is an example of a computer readable medium.

Computer readable media include permanent and non-permanent, removable and non-removable media that are capable of being implemented by any method or technology to store information. The information may be computer readable instructions, data structures, modules of a program or other data. Examples of storage media for computers include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact-disc read only memory (CD-ROM), a digital versatile disc (DVD) or other optical storage, magnetic cartridge tape, magnetic tape disk storage or other magnetic storage equipment or any other non-transport medium that can be used to store information that can be accessed by a computing equipment. As defined herein, computer readable media does not include transitory computer readable media (transitory media), such as modulated data signals and carriers.

It should also be understood that the terms "including", "comprising" or any other variant thereof are intended to cover non-exclusive inclusion, such that a process, a method, a commodity or an equipment including a range of elements includes not only those elements, but also other elements not expressly listed, or which are inherent to such process, method, commodity or equipment. Without further limitation, the elements defined by the statement "including a . . . " do not exclude the existence of additional identical elements in the process, method, commodity or equipment in which the elements are included.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for controlling an interference torque of a vehicle, applied to a new energy vehicle comprising an electric motor and an engine, the method comprising:
    arbitrating between a pedal torque of a driver and an interference torque required by an electronic stability program, and outputting an arbitrated torque;
    performing an initial allocation on the electric motor and/or the engine in response to the pedal torque when the vehicle is in a hybrid drive mode, to meet a torque request of the engine while ensuring that the engine is operated at an optimum operation point; and
    determining, based on the initial allocation, whether the electric motor is capable of fully responding to the arbitrated torque, controlling the electric motor to respond to the arbitrated torque in priority when it is determined that the electric motor is capable of fully responding to the arbitrated torque, and controlling the engine and the electric motor to cooperatively respond to the arbitrated torque when it is determined that the electric motor is incapable of fully responding to the arbitrated torque.

2. The method according to claim 1, wherein the arbitrating comprises:
    determining, as for the interference torque when the ESP requires the torque to increase, that a greater one of the interference torque and the pedal torque is the arbitrated torque; or
    determining, as for the interference torque when the ESP requires the torque to decrease, that a smaller one of the interference torque and the pedal torque is the arbitrated torque.

3. The method according to claim 1, wherein, before the initial allocation is performed, further comprising:
    determining, based on an actual state of the engine, a drive mode of the vehicle, wherein the drive mode comprises the hybrid drive mode and a pure electric mode.

4. The method according to claim 3, further comprising:
    controlling the electric motor to respond to the arbitrated torque when the vehicle is in the pure electric mode.

5. The method according to claim 1, wherein the determining whether the electric motor is capable of fully responding to the arbitrated torque comprises:
    determining a motor torque Fem2 after the electric motor is expected to respond to the arbitrated torque using a formula of: Fem2=Fem1+F2−F1, wherein Fem1 represents the motor torque before the electric motor is controlled to respond to the arbitrated torque, F2 represents the arbitrated torque and F1 represents the pedal torque;
    determining a torque Fem3 to which the motor is capable of responding using a formula of:
    Fem3=Max [Min (Fem2, $F_{UL}$), $F_{LL}$], where $F_{UL}$ is a maximum limit torque of the electric motor, $F_{LL}$ is a minimum limit torque of the motor, Max indicates a greater one of the two, and Min indicates a smaller one of the two; and
    determining that the electric motor is capable of fully responding to the arbitrated torque when Fem3 is equal to Fem2, and determining that the electric motor is incapable of fully responding to the arbitrated torque when Fem3 is not equal to Fem2.

6. The method according to claim 5, wherein the controlling the engine and the electric motor to cooperatively respond to the arbitrated torque comprising:
    determining a torque Feng2 to be responded to by the engine according to an equation of: Feng2=F2−Fem3; and
    controlling the engine to release an ignition angle in rapid response to the determined torque Feng2.

7. The method according to claim 1, wherein the torque request of the engine comprises a fire path request and an air path request, and the method further comprises:
    adjusting the fire path request and the air path request of the engine to keep torques in the fire path request and the air path request to be in consistent when it is determined that the engine and the motor are controlled to respond to the arbitrated torque, cooperatively.

8. The method according to claim 1, wherein the interference torque required by the ESP is a torque required in case of activation of a function of a traction control system of the vehicle.

9. A computing processing equipment, applied to a new energy vehicle comprising an electric motor and an engine, comprising:
    a memory, in which a computer readable code is stored; and
    at least one processor, wherein the computer readable code, when being executed by the at least one processor, causes the computing processing equipment to perform a method comprising:
        arbitrating between a pedal torque of a driver and an interference torque required by an electronic stability program (ESP), and outputting an arbitrated torque;
        performing an initial allocation on the electric motor and/or the engine in response to the pedal torque when the vehicle is in a hybrid drive mode, to meet a torque request of the engine while ensuring that the engine is operated at an optimum operation point; and
        determining, based on the initial allocation, whether the electric motor is capable of fully responding to the arbitrated torque, controlling the electric motor to respond to the arbitrated torque in priority when it is determined that the electric motor is capable of fully responding to the arbitrated torque, and controlling the engine and the electric motor to cooperatively respond to the arbitrated torque when it is determined that the electric motor is incapable of fully responding to the arbitrated torque.

10. The computing processing equipment according to claim 9, wherein the arbitrating further comprises:
    determining, as for the interference torque when the ESP requires the torque to increase, that a greater one of the interference torque and the pedal torque is the arbitrated torque; or
    determining, as for the interference torque when the ESP requires the torque to decrease, that a smaller one of the interference torque and the pedal torque is the arbitrated torque.

11. The computing processing equipment according to claim 9, wherein, before the initial allocation is performed, the operations further comprising:
    determining, based on an actual state of the engine, a drive mode of the vehicle, wherein the drive mode comprises the hybrid drive mode and a pure electric mode.

12. The computing processing equipment according to claim 11, wherein the operations further comprise:
    controlling the electric motor to respond to the arbitrated torque when the vehicle is in the pure electric mode.

13. The computing processing equipment according to claim 9, wherein the determining whether the electric motor is capable of fully responding to the arbitrated torque further comprises:
    determining a motor torque Fem2 after the electric motor is expected to respond to the arbitrated torque using a formula of: Fem2=Fem1+F2−F1,
    wherein Fem1 represents the motor torque before the electric motor is controlled to respond to the arbitrated torque, F2 represents the arbitrated torque and F1 represents the pedal torque;
    determining a torque Fem3 to which the electric motor is capable of responding using a formula of: Fem3=Max [Min (Fem2, $F_{UL}$), $F_{LL}$],
    where $F_{UL}$ is a maximum limit torque of the motor, $F_{LL}$ is a minimum limit torque of the motor, Max indicates a greater one of the two, and Min indicates a smaller one of the two; and
    determining that the electric motor is capable of fully responding to the arbitrated torque when Fem3 is equal to Fem2, and determining that the electric motor is incapable of fully responding to the arbitrated torque when Fem3 is not equal to Fem2.

14. The computing processing equipment according to claim 13, wherein the controlling the engine and the electric motor to cooperatively respond to the arbitrated torque further comprises:
    determining a torque Feng2 to be responded to by the engine according to an equation of: Feng2=F2−Fem3; and
    controlling the engine to release an ignition angle in rapid response to the determined torque Feng2.

15. The computing processing equipment according to claim 9, wherein the torque request of the engine comprises a fire path request and an air path request, and the operations further comprises:
    adjusting the fire path request and the air path request of the engine to keep torques in the fire path request and the air path request to be in consistent when it is determined that the engine and the electric motor are controlled to respond to the arbitrated torque, cooperatively.

16. The computing processing equipment according to claim 9, wherein the interference torque required by the ESP is a torque required in case of activation of a function of a traction control system of the vehicle.

17. A non-transitory computer readable storage medium, applied to a new energy vehicle comprising an electric motor and an engine, in the non-transitory computer readable storage medium, a computer program is stored, the computer program, when being executed by a processor, causes the processor to perform operations that comprise:
    arbitrating between a pedal torque of a driver and an interference torque required by an electronic stability program (ESP), and outputting an arbitrated torque;
    performing an initial allocation on the electric motor and/or the engine in response to the pedal torque when the vehicle is in a hybrid drive mode, to meet a torque request of the engine while ensuring that the engine is operated at an optimum operation point; and
    determining, based on the initial allocation, whether the electric motor is capable of fully responding to the arbitrated torque, controlling the electric motor to respond to the arbitrated torque in priority when it is determined that the electric motor is capable of fully responding to the arbitrated torque, and controlling the engine and the electric motor to cooperatively respond to the arbitrated torque when it is determined that the electric motor is incapable of fully responding to the arbitrated torque.

* * * * *